S. B. BLACK.
Fertilizer.

No. { 1,402, 32,406. }  Patented May 28, 1861.

Witnesses:
C. M. Alexander
Arthur A. Yeatman

Inventor:
J. B. Black

UNITED STATES PATENT OFFICE.

S. B. BLACK, OF HARRISBURG, PENNSYLVANIA.

IMPROVEMENT IN MACHINES FOR SOWING GUANO.

Specification forming part of Letters Patent No. 32,466, dated May 28, 1861.

*To all whom it may concern:*

Be it known that I, S. B. BLACK, of Harrisburg, in the county of Dauphin and State of Pennsylvania, have invented certain new and useful Improvements in Machines for Distributing Guano; and I do hereby declare that the following is a full, clear, and exact description of the same, reference being had to the accompanying drawings, and to the letters of reference marked thereon.

The nature of my invention consists in the construction and arrangement of the several parts hereinafter described.

Figure 1:
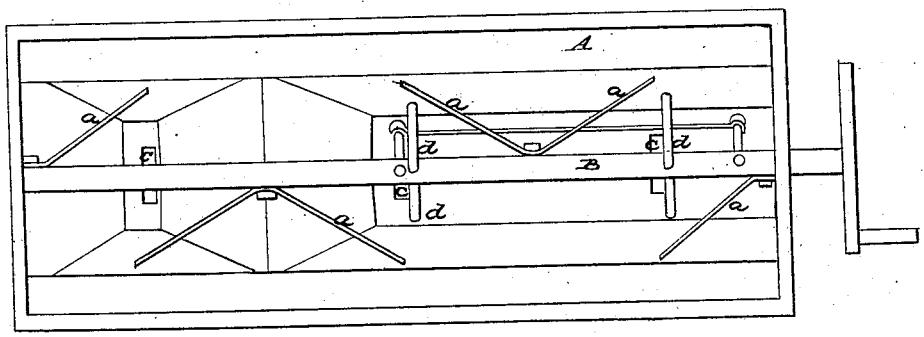
Figure 2:
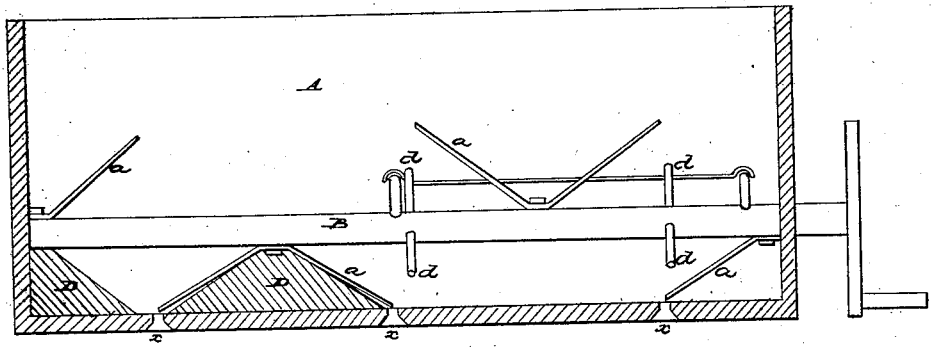

In the annexed drawings, Figure 1 represents a plan view of the machine. Fig. 2 is a longitudinal vertical section of the box.

In the figures, A represents the box which receives the guano to be distributed. Longitudinally of this box is situated a shaft, B, which is provided with a series of arms, $a\ a$, formed in the manner shown, and secured to the shaft by means of bolts or screws, or other convenient manner. The points of these arms cut immediately over or into the holes in the bottom of the box.

$d\ d$ represent a series of pins attached to the shaft perpendicularly, and which may or may not cut into the discharge-openings $x\ x\ x$, as may be desired. I intend them, however, to do so ordinarily. The bottom of the box is made in an irregular form, as shown in one portion of the box, the irregularities being formed by securing in blocks with either one or two inclined sides, as shown. The end blocks have only one inclined side, while those between the openings have two, one side inclining toward each hole, as shown. When the shaft revolves, the arms $a\ a$ cut immediately over the blocks when the arms are down, loosening the guano, so that it will run down toward the discharge-openings. When these arms $a\ a$ revolve with the shaft, they serve to stir the guano above the shaft, to sweep the bottom of the box, and also to cut the guano into the discharge-opening when desired. When the arms are up, they cut the guano in the shape of the inverted blocks D, and it of necessity falls toward the discharge-openings, and is prevented from clogging in the box. By the employment of these arms, so constructed upon the shaft B, a very effective, simple, and cheap machine is formed.

Having thus fully described my invention, what I claim as new, and desire to secure by Letters Patent, is—

The arrangement of the shaft B, arms $a\ a$, pins $d\ d$, and the irregular bottom of the hopper, when the same are used and constructed as and for the purpose herein set forth.

S. B. BLACK.

Witnesses:
  C. M. ALEXANDER,
  ARTHUR A. YEATMAN.